March 27, 1928.
E. FETTER
1,663,694
HANDLE GRIP
Filed July 22, 1925
2 Sheets-Sheet 1
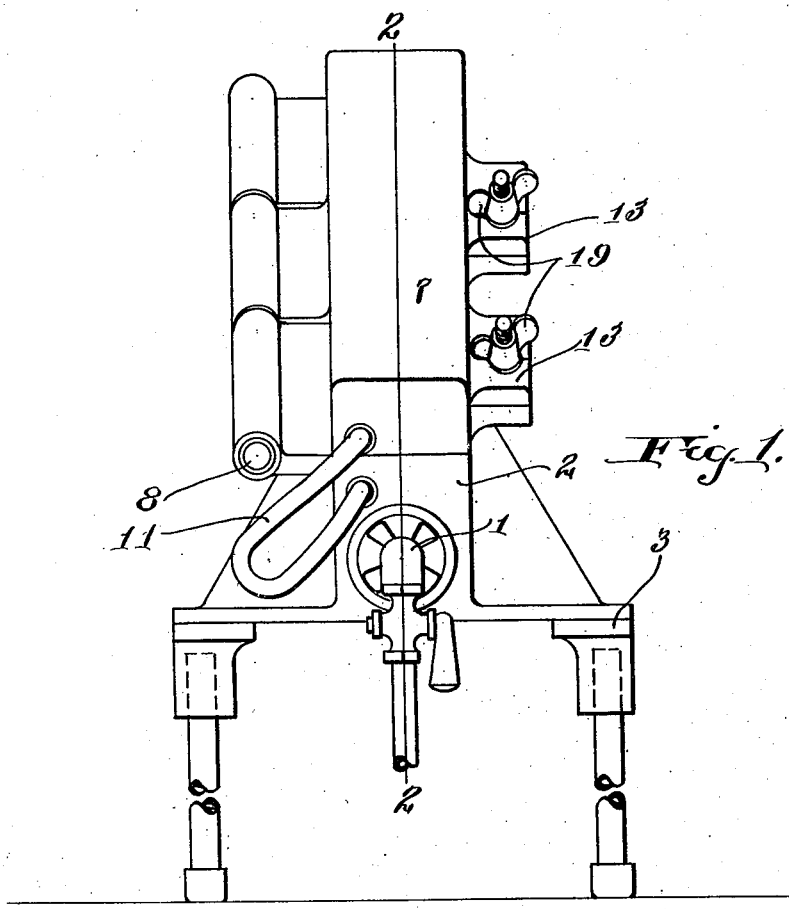
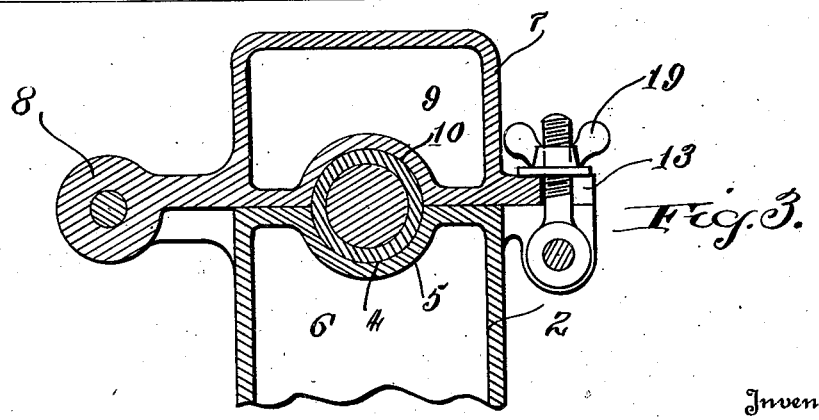

March 27, 1928.

E. FETTER

HANDLE GRIP

Filed July 22, 1925

Witnesses

Inventor
Edward Fetter
By Edwin H Samuels
Attorney

Patented Mar. 27, 1928.

1,663,694

UNITED STATES PATENT OFFICE.

EDWARD FETTER, OF BALTIMORE, MARYLAND.

HANDLE GRIP.

Application filed July 22, 1925. Serial No. 45,159.

The invention relates to a handle grip for athletic implements as golf clubs and the like. There are on the market numerous grips or handle covers which are fastened by nailing, sewing, wrapping and lacing, and some rubber covers are made in tubular form and stretched over the handle, some such stretched covers being roughened to improve the grip. Such covers have not been found durable or desirable, the nailed covers loosen and the nails injure the player, the tubular covers which are stretched on become loosened so that they slip and interfere with the certainty and accuracy of the stroke, and the other types soon wear loose and are discarded.

The present invention relates to an improved handle cover or grip which is formed integral with the stick or handle.

The handle is formed by wrapping the stick or handle with raw rubber, inserting the wrapped portion of the handle in a mold which when closed has a cavity a little smaller than the size of the finished handle and which mold is roughened as to its inner walls so as to produce a roughened or corrugated handle cover, then clamping the mold to press the raw rubber into the crevices of the mold, and heating the mold until the raw rubber which is mixed with proper vulcanizing materials, is vulcanized or cured, producing an integral grip of roughened or corrugated rubber, which rubber is harder and therefore affords a much better grip than does the tubular handle cover or grip which is made soft and pliable, so that it may be stretched on to the stick or handle proper.

In the accompanying drawings I have illustrated a mold in which the vulcanizing process may be performed together with heating means by which the mold may be heated to cure or vulcanize the rubber, the mold being of a suitable shape to form a grip or handle and provided with clamping means for the purposes outlined. The mold also has an opening through which the stick or handle protrudes.

In the drawing—

Figure 1 is an elevation of a vulcanizing apparatus adapted to vulcanize a grip integral with the handle of a golf club or other similar implement.

Figure 3 is a fragmentary transverse section through the mold cavity taken on the line 3, 3 of Figure 2.

Figure 2:
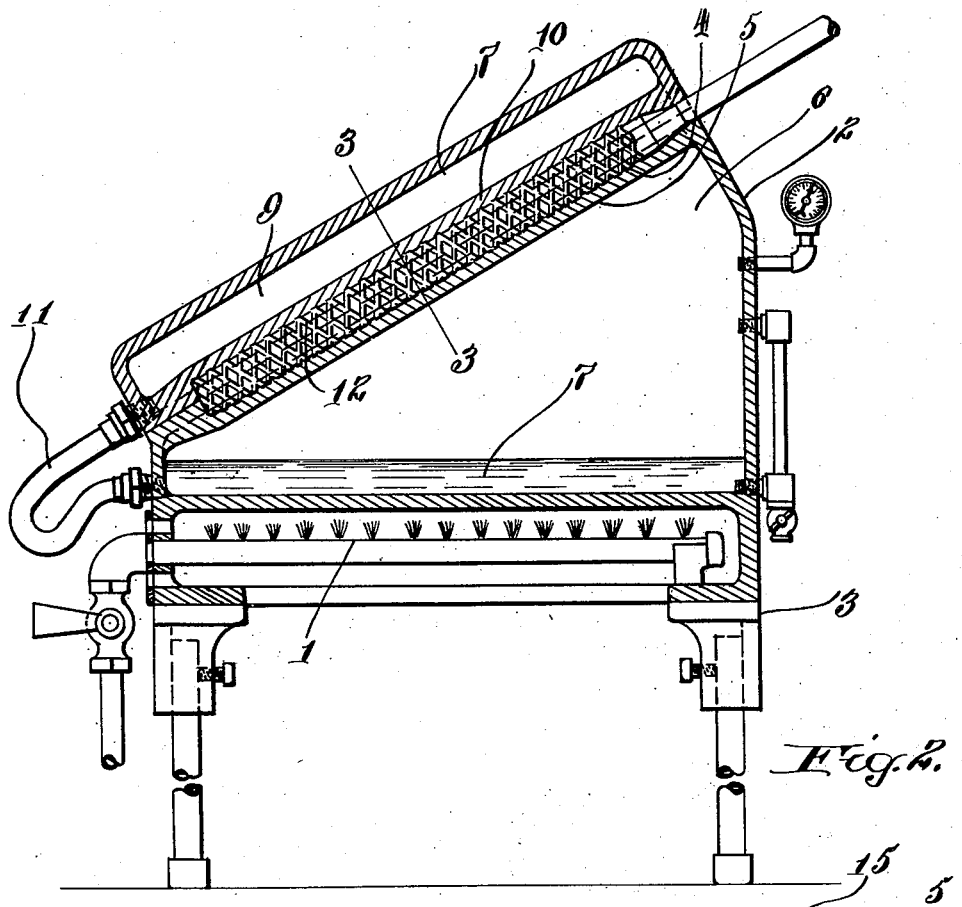
Figure 2 is a vertical section on the line 2, 2 of Figure 1.

Referring to the drawings by numerals, each of which is used to indicate the same or similar parts in the different figures, the vulcanizer, Figures 1, 2 and 3, is of the steam heated type having a gas burner 1 with suitable connections by which heat to generate steam is supplied. The apparatus, as shown, comprises a two-part mold, split or separated along the plane of the greatest cross-section of the mold cavity. The lower mold section 2 is mounted on a suitable stand 3 and the burner 1 is beneath the section 2 also supported on the stand. This lower mold section 2, as shown, has a mold cavity or cavities 4 formed in an upper inclined surface 5 beneath which is a steam chamber 6 partly filled with water 7 from which steam is generated to fill the chamber, the water being evaporated by the heat of the burner 1.

The upper mold section 7 is connected to the rear or lower edge of the lower mold section by a suitable hinge 8. The upper mold section has a steam chamber 9 and a mold cavity 10 therein, which registers when the mold is closed with the mold cavity 4 in the lower section 2. This steam chamber 9 surrounds the mold cavity 10 and is connected to the steam chamber 6 of the lower mold section by flexible tubing 11 whereby steam is supplied to the steam chamber 9 in the walls of the mold cavity of the upper section 7, maintaining an equal temperature of the walls of the mold cavity on all sides. The walls of the mold cavity are, as shown, grooved at 12 in a suitable pattern to form the surface of the grip. The upper and lower sections of the vulcanizer are provided with co-operating ears 13 on each section which are drawn together to close the vulcanizer by means of screws and nuts 19 arranged as illustrated in Figure 1.

Figure 5:
Figure 5 is a transverse section on the line 5, 5 of Figure 4.
Figure 4:
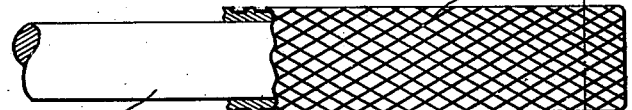
Figure 4 is an elevation of one form of integral grip, a portion of the grip being broken away for convenience in illustration.

In Figures 4 and 5 I have shown a handle having a grip formed of regular tire casing rubber composition 14 vulcanized to the handle and having a roughened or gripping surface 15 convenient for engagement by and with the hands. In this instance the rubber 14 is vulcanized directly to the wood 16.

Figure 7:
Figure 7 is a section like Figure 5 showing still another form.

In Figure 7 I have shown a handle having a grip 17 of vulcanized rubber formed and vulcanized on the handle, the handle being first wound with fabric 18, the raw rubber containing the vulcanizing compound being then wrapped around the handle over the fabric, and the entire handle inserted in the vulcanizer, which is clamped to form the rubber grip and force the material into the grooves.

Figure 6:
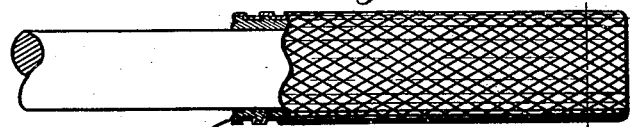
Figure 6 is a view similar to Figure 4 showing a slightly different construction.
Figure 8:
Figure 8 is a section on the line 8, 8 Figure 6.

Figures 6 and 8 show a grip formed of rubber vulcanized on and to the handle, the rubber 20 being covered with fabric 21 on the outside. The handle is roughened by pressing and vulcanizing preferably in a mold having roughened walls as in Figure 2. The pressure causes the fabric covered surface to assume the roughened contour of the mold walls. This gives an exceedingly effective grip.

The method of forming a handle with a rubber grip vulcanized thereon and integral therewith, and of roughening the surface of the grip as formed, has been fully described.

What I claim and desire to secure by Letters Patent is:

1. An athletic implement in the nature of a golf stick having a handle with a grip of rubber formed integrally therewith, having a roughened surface, and a fabric covering vulcanized to the surface and assuming the roughened contour thereof.

2. An athletic implement in the nature of a golf stick having a handle with a grip of rubber formed integrally therewith, and a sheet of fabric covering and vulcanized to the surface.

3. A handle having a grip of rubber with a roughened surface and a fabric covering vulcanized to the surface and assuming the roughened contour thereof.

Signed by me at Baltimore, Maryland, this 18th day of July, 1925.

EDWARD FETTER.